(12) United States Patent
Doering et al.

(10) Patent No.: US 7,921,709 B2
(45) Date of Patent: Apr. 12, 2011

(54) VARIABLE DISPLACEMENT ENGINE DIAGNOSTICS

(75) Inventors: Jeffrey Allen Doering, Canton, MI (US); John Eric Rollinger, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/352,987

(22) Filed: Jan. 13, 2009

(65) Prior Publication Data

US 2010/0175463 A1    Jul. 15, 2010

(51) Int. Cl.
*G01M 15/00* (2006.01)
(52) U.S. Cl. .................... 73/114.79; 73/114.37
(58) Field of Classification Search ............... 73/114.31, 73/114.79, 114.37
See application file for complete search history.

(56) References Cited

U.S. PATENT DOCUMENTS

| | | | |
|---|---|---|---|
| 4,549,514 A | 10/1985 | Abe et al. | |
| 4,999,781 A * | 3/1991 | Holl et al. | 701/108 |
| 5,557,971 A | 9/1996 | Uemura et al. | |
| 5,721,375 A * | 2/1998 | Bidner | 73/114.79 |
| 6,243,641 B1 | 6/2001 | Andrews et al. | |
| 6,382,175 B1 | 5/2002 | van der Staay et al. | |
| 6,457,353 B1 * | 10/2002 | Kanke et al. | 73/114.42 |
| 6,741,924 B2 * | 5/2004 | Iwasaki et al. | 701/114 |
| 6,945,227 B2 * | 9/2005 | Russell et al. | 123/399 |
| 7,017,551 B2 * | 3/2006 | Shimizu | 123/399 |
| 7,063,057 B1 * | 6/2006 | Waters et al. | 123/90.16 |
| 7,171,929 B2 * | 2/2007 | Dosdall et al. | 123/90.15 |
| 7,204,132 B2 * | 4/2007 | Reed et al. | 73/114.79 |
| 7,444,236 B2 * | 10/2008 | Wiles | 701/114 |
| 7,469,672 B2 * | 12/2008 | Andri | 123/198 F |
| 7,546,827 B1 * | 6/2009 | Wade et al. | 123/324 |
| 7,559,309 B2 * | 7/2009 | Winstead | 123/198 F |
| 2003/0191567 A1 * | 10/2003 | Gentilcore | 701/35 |
| 2005/0205048 A1 * | 9/2005 | Winstead | 123/198 F |
| 2006/0243030 A1 | 11/2006 | Oe et al. | |
| 2008/0092836 A1 * | 4/2008 | Mutti et al. | 123/90.16 |

FOREIGN PATENT DOCUMENTS

JP    403279626 A    12/1991

OTHER PUBLICATIONS

Doering, Jeffrey Allen, et al., "Variable Displacement Engine Diagnostics", U.S. Appl. No. 12/352,989, filed Jan. 13, 2009, 35 pgs.

* cited by examiner

*Primary Examiner* — Freddie Kirkland, III
(74) *Attorney, Agent, or Firm* — Allan J. Lippa; Alleman Hall McCoy Russell & Tuttle LLP

(57) ABSTRACT

Methods and systems are provided for monitoring cylinder valve deactivation of a cylinder valve of an engine. One example method comprises, indicating degradation of cylinder valve deactivation in response to manifold pressure at or around a characteristic frequency.

16 Claims, 5 Drawing Sheets

VARIABLE DISPLACEMENT ENGINE DIAGNOSTICS

FIELD

The present application relates to methods for monitoring cylinder valve operation in a variable displacement engine (VDE).

BACKGROUND AND SUMMARY

Engines operating with a variable number of active or deactivated cylinders may be used to increase fuel economy, while optionally maintaining the overall exhaust mixture air-fuel ratio about stoichiometry. In some examples, half of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves.

Various approaches have been identified for diagnosing degradation in VDE operation, such as based on crankshaft vibrations related to engine firing order, firing frequency, etc. However, the inventors herein have recognized a disadvantage with such approaches. As an example, such approaches may be unable to identify particular situations, such as when one cylinder valve of a cylinder is properly deactivated, but another valve in the same cylinder continues to operate even when it is commanded to be deactivated.

Thus, in one example, the above issue may be addressed by a method of monitoring cylinder valve deactivation of a cylinder valve of an engine, the method comprising indicating degradation of cylinder valve deactivation in response to manifold pressure at or around a characteristic frequency.

In one example situation, a cylinder is commanded to be deactivated, and while an exhaust valve is properly deactivated, an intake valve continues to open during the intake stroke. Herein, the operation of the intake valve will cause intake air to be drawn into the cylinder and compressed. However, as the exhaust valve remains closed, the gasses in the cylinder will be expanded and then re-compressed during the exhaust stroke. As such, when the intake valve opens again at or near the next intake stroke, the compressed gas in the cylinder may be rapidly released and expanded in to the intake manifold. This rapid expansion may excite the resonance frequency of the air in the intake manifold, thereby creating pressure oscillations, vibrations, and noise, which may be compared to the striking of a bell. By monitoring the manifold pressure response at or around a characteristic frequency, such as the resonant acoustic frequency of air in the intake manifold, during selected conditions, such as the intake stroke or intake valve lift event of a cylinder, valve deactivation degradation may be identified.

In another example situation, a cylinder is commanded to be activated and while the intake valve is properly activated, an exhaust valve continues to remain closed during the exhaust stroke, or opens with a delay. Herein, as in the previous example situation, the gasses in the cylinder will be expanded and then re-compressed during the exhaust stroke. When the intake valve opens again at or near the next intake stroke, the compressed gas in the cylinder may be rapidly released and expanded in to the intake manifold, creating pressure oscillations, vibrations, and noise. Herein, as in the previous example, degradation of cylinder valve activation may be indicated in response to manifold pressure at or around a characteristic frequency, such as the resonant acoustic frequency of air in the intake manifold, during selected conditions, such as the intake stroke or intake valve lift event of a cylinder.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for monitoring valve operation in cylinders of an engine operating with variable displacement. As such, the variable displacement engine (VDE), such as the engine depicted in FIGS. 1-2, can switch between operation with all cylinders firing or half the cylinders firing by changing the operation of the intake and exhaust valves of selected cylinders, however, various other cylinder valve deactivation approaches may be used, such as with electric valve actuators. An engine control system uses manifold pressure comparisons, such as those depicted in FIGS. 3A-B, to distinguish between a fully functioning versus a degraded VDE operation. During a degraded VDE operation, for example, an audible popping sound may be heard due to resonance of the intake manifold air at characteristic frequencies (herein also referred to as "MAP ringing"). By processing the manifold pressure data (for example using the routine described in FIG. 5) and further based on the sampling window and/or firing order of the cylinders, the control system may identify the location of the degraded valve (for example using the routine described in FIG. 4) and correlate the ringing data to a particular cylinder or group of cylinders. In this way, the diagnostics routine of the present disclosure can accurately identify VDE transition issues with reduced reliance on band-pass filtering, and also while using significantly lower levels of sampling as compared to other frequency-based diagnostic routines. However, high frequency sampling and band-pass filtering may be used, if desired.

Figure 1:
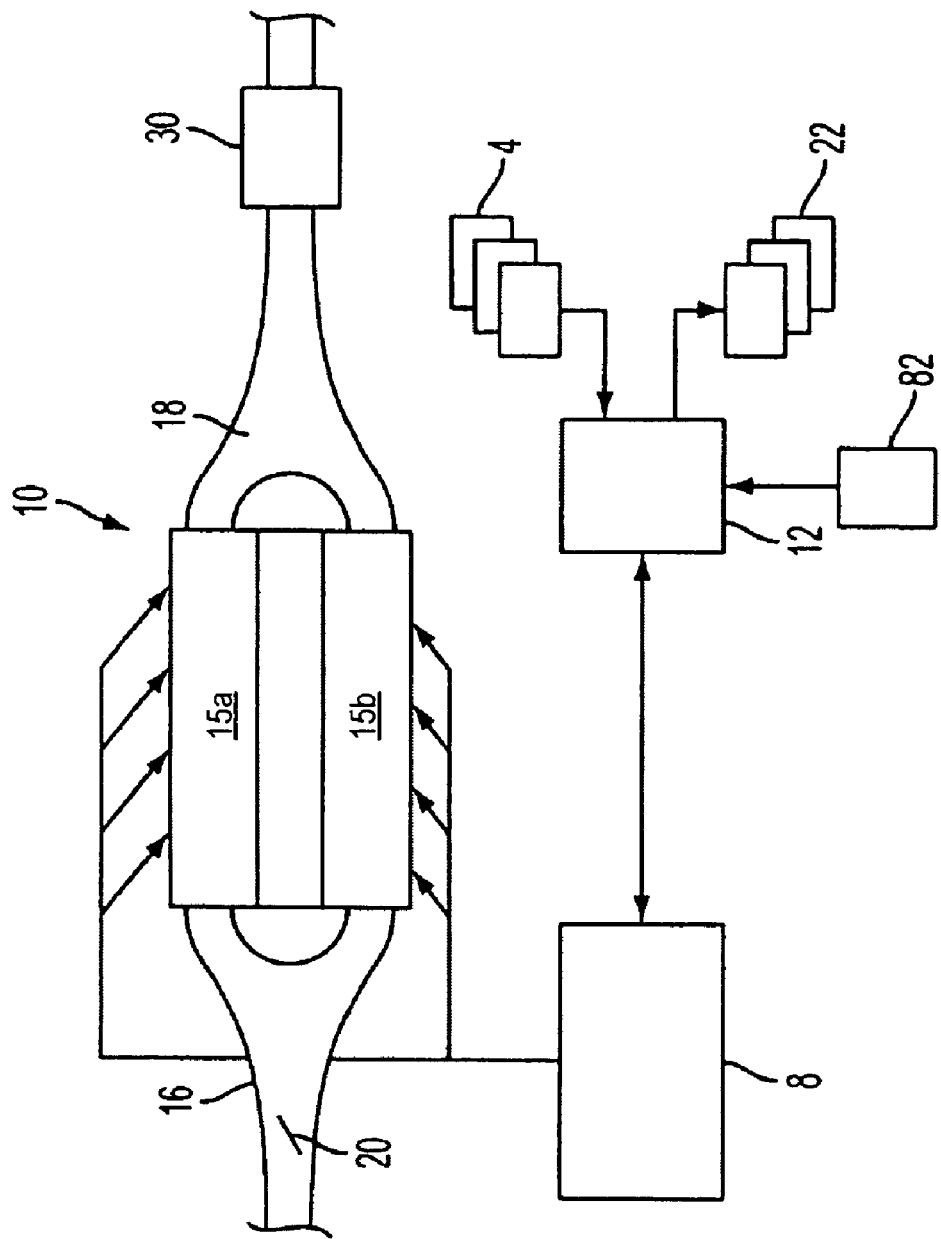
FIG. 1 shows an example engine and exhaust system layout.

FIG. 1 shows an example variable displacement engine (VDE) 10, in which four cylinders (e.g., two in each bank) may have cylinder valves held closed during one or more engine cycles. The cylinder valves may be deactivated via hydraulically actuated lifters, or via a cam profile switching (CPS) mechanism in which a cam lobe with no lift is used for deactivated valves. As depicted herein, engine 10 is a V8 engine with two cylinder banks 15a and 15b having an intake manifold 16 (with throttle 20) and an exhaust manifold 18 coupled to an emission control system 30 including one or more catalysts and air-fuel ratio sensors.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle. Further, controller 12 may receive an indication of knock from knock sensor 82.

Figure 2:
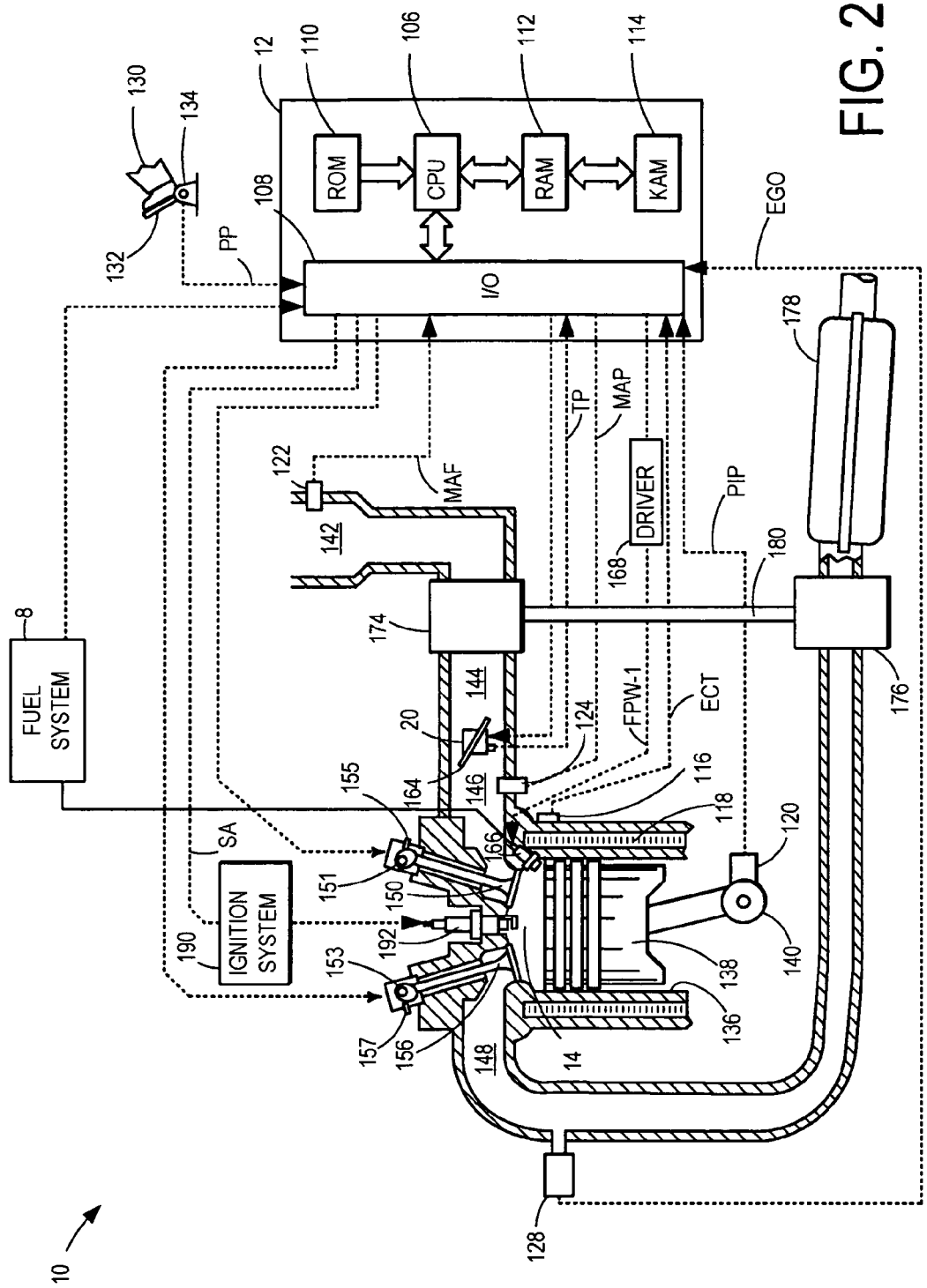
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber') 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The valves of deactivatable cylinder 14 may be deactivated via hydraulically actuated lifters coupled to valve pushrods, or via a cam profile switching mechanism in which a cam lobe with no lift is used for deactivated valves. In this example, deactivation of intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems.

As depicted herein, in one embodiment, deactivation of intake valve 150 may be controlled by cam-based VDE actuator 151 while deactivation of exhaust valve 156 may be controlled by cam-based VDE actuator 153. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel, as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

Controller 12 is shown in FIG. 2 as a microcomputer, including microprocessor unit 106, input/output ports 108, an electronic storage medium for executable programs and calibration values shown as read only memory (ROM) chip 110 in this particular example, random access memory (RAM) 112, keep alive memory (KAM) 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold air pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold air pressure signal MAP from manifold pressure sensor 124 may be used to provide an indication of vacuum, or pressure, in the intake manifold. Further, as noted herein, manifold pressure may be estimated based on other operating parameters, such as based on MAF and RPM, for example.

Figure 3A:
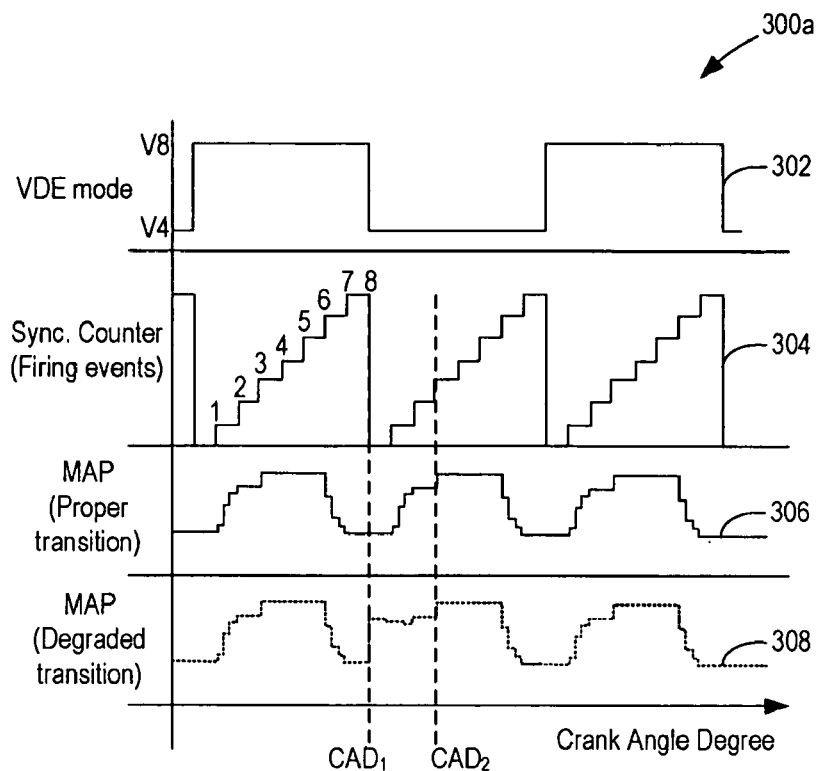
FIGS. 3A-B show maps of variation in manifold absolute pressure (MAP) signals for each intake valve during engine operation.
Figure 3B:
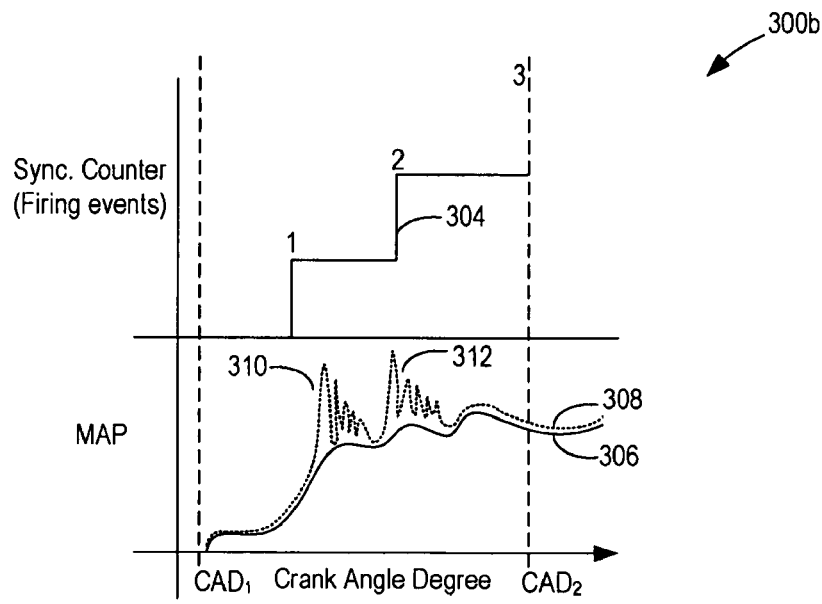

As further elaborated in FIGS. 3A-B, controller 12 may monitor signals and/or information indicative of manifold pressure (such as signal MAP) over successive firing events, and based on unexpected variations in MAP, including resonance patterns at characteristic frequencies, and (audible or inaudible) popping sounds, controller 12 may distinguish properly functioning and degraded VDE transitions. Specifically, the controller may be configured to perform an approximation to a fast fourier transformation (FFT) based signal processing to detect the specific resonant frequency content in the abnormal MAP signal during a specific cylinder's (or group of cylinders') intake stroke or intake valve lift event to identify whether the resonance (and related popping) is due to an intake valve or exhaust valve degradation in that specific cylinder. FIG. 3A illustrates map 300a depicting variations in a measured or estimated MAP signal over successive firing (or non-firing) events during a VDE transition. As such, the cylinders may alternate between a VDE (or V4) mode of operation and a non-VDE (or V8) mode of operation, as indicated in graph 302. The successive firing events, as depicted by the steps of the synchronization counter in graph 304, are indicative of successive firing cylinders. The successive firing events may be numbered 1-8, as depicted. It will however be appreciated that the numbering is only indicative of the succession of events (that is, a first firing/non-firing cylinder, then a second firing/non-firing cylinder, and so on) and not indicative of the actual firing order of the cylinders (that is, not cylinder 1 followed by cylinder 2, and so on). Thus, when shifting from a V4 to a V8 mode (exit from VDE), previously deactivated cylinders may be activated and all 8 cylinders may fire. In contrast, when shifting from a V8 to a V4 mode (entry into VDE), selected cylinders may be deactivated. In one example, the first four cylinders in the firing order may be deactivated, while the next 4 cylinders in the firing order may fire.

Graph 306 (solid line) represents an example of characteristic MAP variations during a properly functioning VDE transition while graph 308 (dotted line) represents one example of MAP variations during a degraded VDE transition. The variations in MAP signals may be plotted against a sampling time, defined herein by a specific number of crank angle degrees (CAD). As such, based on the sampling window where an abnormal MAP signal may be identified, the controller may determine the identity of the responsible cylinder and the degraded valve. As shown herein, an abnormal MAP pattern may be determined during firing events occurring between times $CAD_1$ and $CAD_2$. Further details of the variations in MAP patterns in this sampling window are elaborated with reference to FIG. 3B.

Degraded valve events may also lead to an audible popping sound. In one example, the degraded valve event may include a delayed intake valve closure. In another example, the degraded valve event may include a delayed exhaust valve opening. In either case, an audible popping sound may be heard due to the burn mixture being compressed against a closed exhaust valve and then the pressure being vented into the intake manifold when the intake valve subsequently opens. Thus, in either case, valve degradation may translate into a pressure spike in the MAP signal and the MAP signal ringing (or resonating) in the intake manifold. As such, either case may be responsible for the driver hearing an audible popping sound. As elaborated herein with reference to FIGS. 4-5, the controller may identify the nature of valve degradation during a degraded VDE transition based on the signal content of the MAP ringing or resonance at or around a characteristic acoustic frequency. It thus follows that the louder the popping sound that may be heard by the driver, the higher the probability that the controller will identify the valve degradation. However, it will be appreciated that the controller may also identify valve degradation events when the MAP ringing is not large enough to cause a popping sound.

FIG. 3B shows a zoomed-in comparison of the variations in MAP signal for the sampling window $CAD_1$ to $CAD_2$. Specifically, a portion of graph 306 (solid line) of FIG. 3A corresponding to the selected sampling window is shown juxtaposed against a corresponding portion of graph 308 (dotted line). The order and sequence of firing events for the same sampling window is shown by the corresponding portion of synchronization counter line 304. As indicated, the sampling window depicts firing events 1 through 3. In contrast to the MAP signal pattern exhibited during a properly functioning VDE transition (as shown by graph 306), the signal pattern exhibited during the degraded VDE transition (as shown by graph 308) exhibits resonance. In the depicted example, two distinct MAP ringing events may be observed at two distinct firing events. These distinct MAP ringing events are indicated by the group of resonance peaks 310 and 312. It will be appreciated that when MAP ringing occurs, the intake manifold resonates at characteristic frequencies. It will also be appreciated that the resonance of each cylinder's intake and/or exhaust valve corresponds to a unique sampling window in the synchronization counter. A controller may be configured to calculate the amplitude of resonance at or around these characteristic frequencies using a routine that employs various factors including the sampling window. Further, by using data detrending techniques, dot products with characteristic waveforms, and fast fourier transformation (FFT) based methods, the controller may determine the energy content of the resonance at the characteristic frequency, or in a related characteristic frequency range. One example of such a routine is elaborated herein with reference to FIG. 4. Further, one example of using data detrending, dot product formation and FFT based methods to calculate the energy content of resonances is elaborated herein with reference to FIG. 5.

In one example, by calculating the energy content of the resonance peaks 310 and 312, a controller may first determine whether the MAP ringing event is due to an actual valve degradation event (for example, if the energy content of the resonance is greater than a predetermined threshold) or whether the ringing is due to background noise in the intake manifold (for example, if the energy content of the resonance is lower than a predetermined threshold). Once the controller has established that the MAP ringing is due to valve degradation, the controller may further determine the location of the cylinder (or group of cylinders) where a valve degradation has occurred and also the nature of the degraded valve. Thus, in this example, a controller may compute that the energy content of resonance peaks 310 and 312 is significant and thus due to a valve degradation. Further, based on the sampling window (for example, defined herein by the region $CAD_1$ to $CAD_2$), and the current mode of VDE operation (herein, entry into VDE or V4 mode of operation), the controller may determine that resonance peaks 310 and 312 are due to one cycle delays in the closure (or deactivation) of the cylinders with intake valve lift events corresponding to the engine crank angle location of the resonance. The identification of a physical cylinder number may then be based on the engine firing order. As such, the sampling window may be selected such that there may be little to no signal overlap for the intake (or exhaust) valves of differing cylinders. Additionally, for valves operating with VCT, the sampling window may be appropriately adjusted (for e.g., broadened or retarded) when operating with cam retard or cam advance, and vice versa. That is, a valve timing of at least one of the cylinder valves may be adjusted, and further, the sampling window may be adjusted responsive to the adjusted valve timing. In this way, the diagnostics routine may be extended to engines operating valves with cam timing adjustment.

It will be appreciated that while the depicted example shows a method for identifying valve degradation in a single cylinder, the same may be extended to a group of cylinders. In one example, each cylinder and/or each valve in each cylinder, may have independent deactivation mechanisms and thus may be diagnosed independently. In another example, a group of cylinders or a group of valves (on a plurality of cylinders) may share a common deactivation mechanism and thus may be diagnosed as a group. As such, based on the deactivation configuration, the VDE diagnostics routine may accordingly diagnose and identify a single cylinder and/or valve or a group of cylinders and/or valves during abnormal MAP responses.

Figure 4:
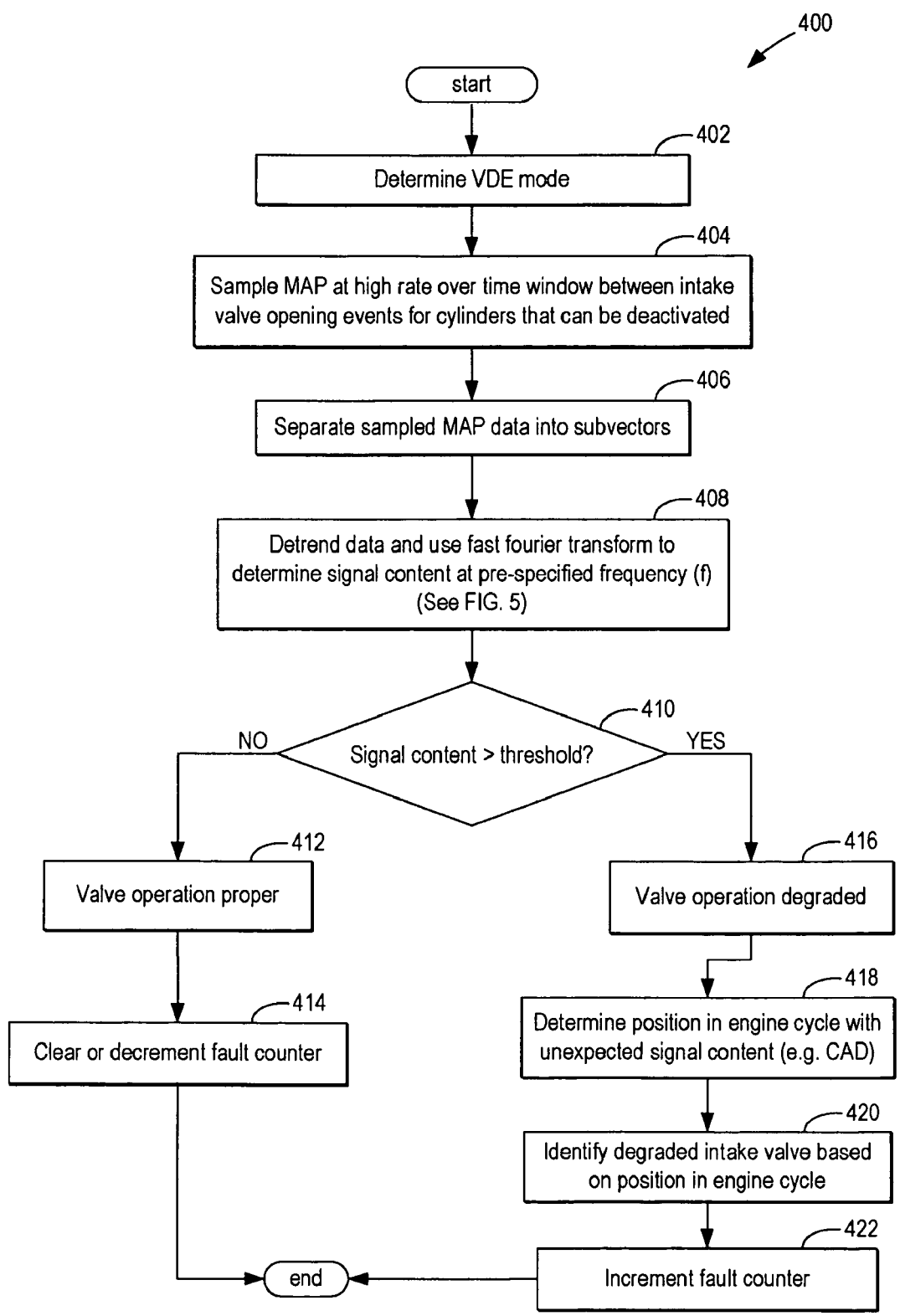
FIG. 4 shows a high level flow chart for a MAP signal-based VDE diagnostics routine.

Now turning to FIG. 4, an example VDE diagnostics routine 400 is described for identifying degraded valve operation using MAP signals. At 402, the VDE mode of operation may be determined. For example, when operating with an 8-cylinder engine, it may be determined whether the engine is operating in V4 mode (or entry into VDE mode) or in V8 mode (or exit from VDE mode). At 404, an intake MAP may be sampled at a high rate (for example at 1-2 kHz) over a sampling window between intake valve opening events for the cylinders that can be deactivated. As one example, the sampling window may be a crank angle sampling window, defined by a number of crank angle degrees (CAD). In one example, when the engine is entering a VDE mode (for example, entry into V4 mode), and cylinders corresponding to firing order 1-4 are to be deactivated, MAP may be sampled over a sampling window corresponding to 90 CADs. In another example, when the engine is exiting a VDE mode (for example, entry into V8 mode), and cylinders corresponding to firing order 1-8 are to be activated, MAP may be sampled over a sampling window corresponding to 180 CADs bracketing the intake stroke of each cylinder. Further, the manifold pressure may be sampled in each of a plurality of sampling windows.

At 406, the sampled MAP data may be separated into subvectors. At 408, the data in each subvector may be detrended and may be further processed with an approximation to a fast fourier transformation to determine the signal content of the data at a prespecified characteristic frequency. In this way, a manifold pressure signal content at or around a characteristic frequency may be determined during an intake stroke or intake valve event of a cylinder (or group of cylinders) of the engine. In one example, the characteristic frequency selected may be a resonant acoustic frequency of the intake manifold of the engine. In another example, more than one characteristic resonant frequency may be used and the metrics resulting from signal processing using multiple frequencies may then be statistically combined (maximum, minimum, average, etc.). Further details regarding the data detrending and data transformation are described herein with reference to FIG. 5.

At 410, it may be determined whether the signal content of the MAP data is greater than a predetermined threshold. The threshold valve may be based on a VDE mode of operation and/or engine operating conditions. If not, then at 412, it may be determined that a properly functioning valve operation and VDE transition has occurred. Accordingly, at 414, an associated fault counter may be cleared or the fault count may be decremented.

If the signal content is greater than the predetermined threshold, then at 416 a degraded valve operation and degraded VDE transition may be determined and indicated. As such, an indication of degradation may include an indication in degradation of a cylinder deactivation mechanism coupled to the cylinder valve. Accordingly, at 418, the position in the engine cycle (for example, the CAD) where the unexpected MAP signal content was received may be determined. At 420, the identity of the degraded valve may be determined based on the position identified at 418. In this way, the indication of degradation may identify that, for a given cylinder, at least one valve is operating while at east another valve is maintained closed, over four strokes of a piston cycle in the cylinder. At 422, the fault count on the associated fault counter may be incremented. That is, upon identifying a degraded valve operation, an appropriate diagnostic code may be set in the control system.

In this way, degradation of cylinder valve deactivation may be identified and indicated, and further, valve degradation among a plurality of cylinders valves of the engine may be differentiated based on the MAP signal content at or around a characteristic frequency and based on a crank angle at which the signal content is greater than a predetermined amount.

Figure 5:
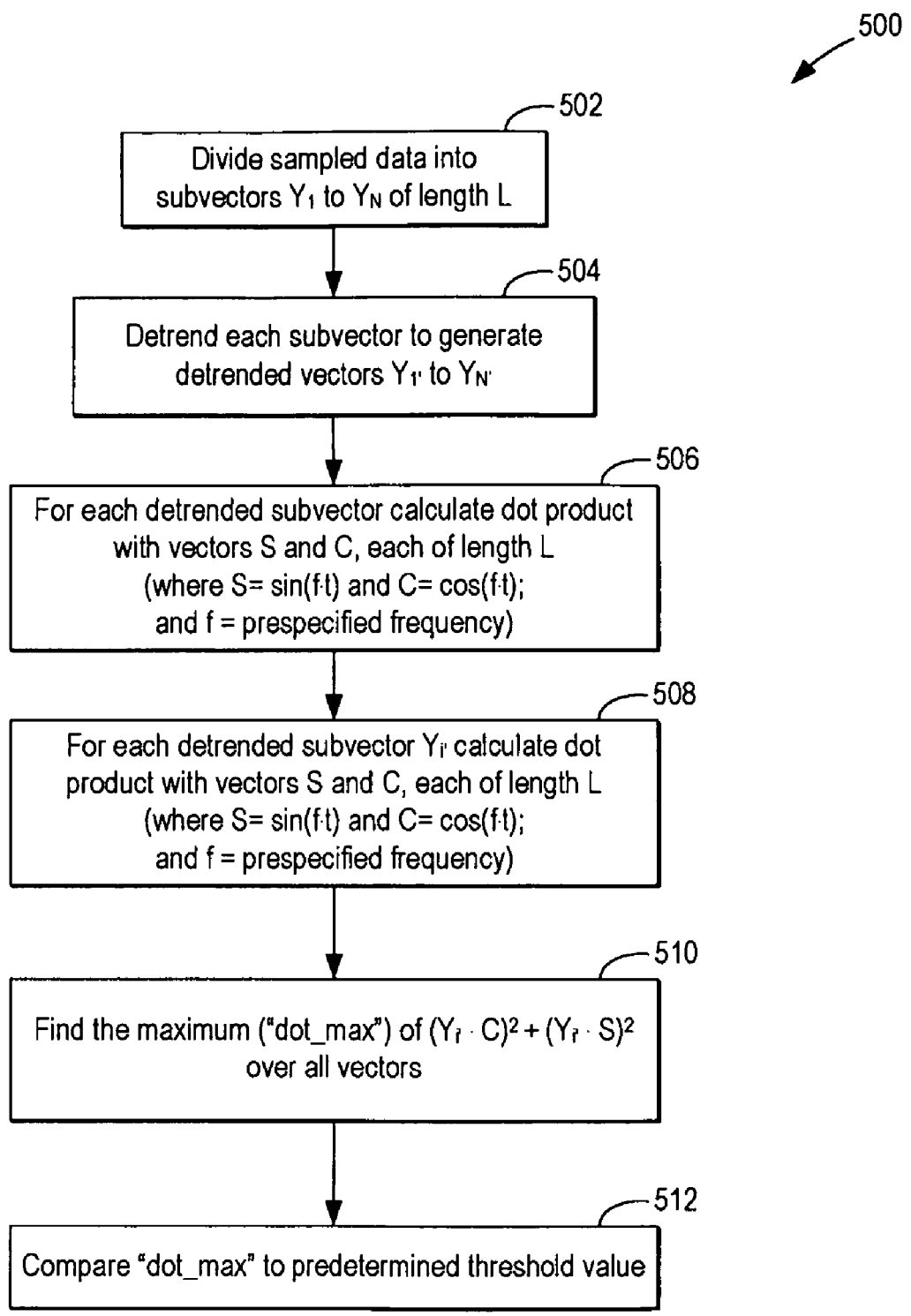
FIG. 5 shows a high level flow chart for processing the MAP signal-based data received in FIG. 4 according to the present disclosure.

Now turning to FIG. 5, a routine for MAP data processing and elucidating a signal content of the MAP resonance is detailed. As such, the routine includes data detrending techniques and FFT methods. At 502, the sampled MAP data may be divided into subvectors $Y_1$ to $Y_N$ of length L. The length L of the subvectors may be determined so that a set of samples length L at the sampling frequency corresponds to one or more whole periods of oscillation at a specified frequency. At 504, each subvector may be detrended to generate corresponding detrended subvectors $Y_1$ to $Y_{N'}$. Herein, by detrending, the data may be linearized. In one example, detrending may be achieved by subtracting a best fit line (for example of the kind y=mx+b) from each subvector. Alternatively, other appropriate methods for finding and removing slow trends in the data may be used.

At 506, a dot product for each subvector with vectors S and C may be determined. As such, vectors S and C may have a mean of zero, a length L, and may be mutually orthogonal to each other. In one example, S may be a sine function vector defined as S=sin(f·t) while C may be a cosine function vector defined as C=cos(f·t). Herein, f may be the characteristic frequency at which resonance may be measured and t may be a vector of length L. Herein, L may be defined as the number of whole periods of the frequency f at the sampling rate of the MAP data.

At 508, a maximum dot product value, defined herein as "dot_max", may be determined for each subvector ($Y_T$) using the equation: $dot\_max=(Y_T \cdot C)^2+(Y_T \cdot S)^2$ over the plurality of subvectors. As such, this may represent a fast fourier transformation (FFT) for determining the signal content. While the depicted example routine shows a maximum value being calculated, in alternate embodiments, an alternative statistical value may be chosen. At 510, the maximum dot product value obtained may be compared to a predetermined threshold. As such, the threshold may be determined based on one or more engine operating parameters including, but not limited to, an engine speed, a cam timing, an engine load and a manifold pressure.

In one example routine, MAP may be sampled at 2 kHz. Next, the MAP samples may be separated out (into subvectors $Y_T$) according to the intake stroke of each individual VDE cylinder. Following detrending, all subvectors ($Y_T$) of 8 ms windows (that is L=8) that are in the intake stroke window may be selected. As such, 16 such samples may be identified. The time vector t may be defined from zero with 0.5 ms increments. The characteristic frequency selected (f) may be 500 Hz. Accordingly, the FFT performed may correspond to the equation: $dot\_max=\{Y_T \cdot cos(500\ t)\}^2+\{Y_T \cdot sin(500\ t)\}^2$ and may determine the signal content at 500 Hz. Based on the amplitude of the signal as determined by the FFT equation, and further based on the predetermined threshold, a controller may determine whether the VDE transition was as expected or degraded. It will be appreciated that herein 500 Hz corresponds to a prespecified characteristic frequency which may be based on defined vehicle parameters such as the building material of the intake manifold, or settings of manifold tuning devices. Thus, once determined, the same value of f may be reused for future calculations. It will also be appreciated that in alternative embodiments, a prespecified frequency range may be used.

In this way, a frequency based diagnostic method may be used to determine the effectiveness of VDE transitions without necessitating fast sampling levels and/or signal bandpass filtering. Even with smaller sampling and without the use of a bandpass filter, the diagnostic routine described herein maintains accuracy of detection, being able to identify a cycle's first "pop" or ringing event on VDE entry with late intake valve deactivation, even though this may be 6 sigma away from the normal. By filtering noise signals and by validating MAP sensor signals, the method is able to reliably detect intermittent VDE transition errors. Further, by adjusting the sampling window, the diagnostics method may be applied to valves operating both with and without cam timing adjustments. By using data detrending and FFT methods to identify the signal content of a MAP resonance at characteristic frequencies, and further based on non-overlapping sampling windows, the method enables rapid and reliable identification of a degraded valve during intermittent VDE transition errors.

Note that the example process flows included herein can be used with various valve system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for monitoring cylinder valve deactivation of a cylinder valve of an engine, comprising:
setting a diagnostic code in a control system indicating degradation of cylinder valve deactivation in response to a manifold pressure response to cylinder valve events, the manifold pressure response at or around a characteristic frequency and during an intake valve event of the engine, the characteristic frequency including a resonant acoustic frequency of an engine intake manifold.

2. The method of claim 1 further comprising, differentiating valve degradation among a plurality of cylinder valves of the engine based on a signal content of the manifold pressure response and a crank angle at which the signal content is greater than a threshold amount.

3. The method of claim 2, wherein the engine is a variable displacement engine (VDE) configured to operate in a first VDE mode of operation with one or more engine cylinders deactivated, or a second non-VDE mode of operation, wherein the threshold amount is based on the engine mode of operation and engine operating conditions, and wherein the indication of degradation includes an indication of degradation of a cylinder deactivation mechanism coupled to the cylinder valve.

4. The method of claim 1 further comprising, sampling manifold pressure in each of a plurality of sampling windows.

5. The method of claim 4 wherein the sampling window is a crank angle sampling window.

6. The method of claim 5 further comprising, adjusting a valve timing of at least one of the cylinder valves, and further adjusting the sampling window responsive to the adjusted valve timing.

7. The method of claim 1 wherein the indication of degradation identifies that, for a cylinder, at least one valve is operating while at least another valve is maintained closed, over four strokes of a piston cycle in the cylinder.

8. A method for monitoring a cylinder valve deactivation mechanism coupled in an engine, the cylinder valve deactivation mechanism coupled to at least a cylinder valve of a cylinder of the engine, the cylinder having a plurality of cylinder valves with variable cam timing, the method comprising:
monitoring a signal indicative of intake manifold pressure of the engine;
sampling the signal at least over a movable crank angle window, the crank angle window adjusted responsive to adjustments in cam timing; and
indicating degradation of the cylinder valve deactivation mechanism in response to a magnitude of the sampled signal at or around a characteristic resonant frequency of the intake manifold pressure.

9. The method of claim 8 wherein the indication of degradation includes setting a diagnostic code in a control system.

10. The method of claim 9 wherein the characteristic frequency includes a resonant acoustic frequency of an intake manifold of the engine.

11. The method of claim 10 wherein the indication is based on a manifold pressure signal content at or around the resonant acoustic frequency during an intake stroke or intake valve lift event of a cylinder of the engine, wherein the resonant acoustic frequency is adjusted responsive to operating conditions or settings of manifold tuning devices.

12. The method of claim 11 further comprising differentiating valve degradation among the plurality of cylinder valves of the engine based on the signal content and a crank angle at which the signal content is greater than a threshold amount.

13. The method of claim 12 wherein the threshold value is based on a VDE mode of operation and engine operating conditions.

14. The method of claim 13 wherein the indication of degradation identifies that, for a cylinder, at least one valve is operating while at least another valve is maintained closed, over four strokes of a piston cycle in the cylinder.

15. A system, comprising:
an engine having a crankshaft and a plurality of cylinders, each cylinder with a plurality of cylinder valves;
a deactivation mechanism for deactivating at least one cylinder valve;
a variable cam timing mechanism for adjusting a timing of at least one cylinder valve;
an intake manifold;
a sensor providing information indicative of manifold pressure; and
a control system configured to receive a signal from the sensor, sample the signal indicative over a movable crank angle window, the crank angle window adjusted responsive to adjustments in cam timing and including an intake stroke of a cylinder of the engine, indicate degradation of the valve deactivation mechanism in response to a magnitude of the sampled signal at or around a characteristic resonant frequency of the intake manifold pressure, and to differentiate valve degradation among the plurality of cylinder valves of the engine based on the signal content and a crank angle at which the signal content is greater than a threshold amount.

16. The system of claim 15 wherein the control system is further configured to indicate that at least one valve is operating while at least another valve is maintained closed, over four strokes of a piston cycle in the cylinder in which the mechanism has degraded.

* * * * *